(12) United States Patent
Nagata et al.

(10) Patent No.: US 11,249,568 B2
(45) Date of Patent: Feb. 15, 2022

(54) TOUCH-PANEL-INTEGRATED DISPLAY DEVICE

(71) Applicant: SHARP KABUSHIKI KAISHA, Sakai (JP)

(72) Inventors: Kosuke Nagata, Sakai (JP); Masayuki Hata, Sakai (JP); Mikihiro Noma, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 803 days.

(21) Appl. No.: 16/071,195

(22) PCT Filed: Jan. 19, 2017

(86) PCT No.: PCT/JP2017/001732
§ 371 (c)(1),
(2) Date: Jul. 19, 2018

(87) PCT Pub. No.: WO2017/126603
PCT Pub. Date: Jul. 27, 2017

(65) Prior Publication Data
US 2021/0208714 A1    Jul. 8, 2021

(30) Foreign Application Priority Data

Jan. 20, 2016  (JP) .............................. JP2016-008634

(51) Int. Cl.
*G06F 3/041*         (2006.01)
*G09G 3/36*          (2006.01)

(52) U.S. Cl.
CPC ......... *G06F 3/0412* (2013.01); *G09G 3/3607* (2013.01); *G09G 3/3614* (2013.01); *G09G 3/3648* (2013.01); *G06F 3/04166* (2019.05)

(58) Field of Classification Search
CPC ......... G09G 3/3614; G09G 2300/8023; G09G 2310/0254; G09G 2300/0426;
(Continued)

(56) References Cited

U.S. PATENT DOCUMENTS

2008/0158125 A1*  7/2008  Mori ..................... G09G 3/3648
                                                                 345/92
2009/0128545 A1*  5/2009  Lee ........................ G06F 3/0412
                                                                 345/214

(Continued)

FOREIGN PATENT DOCUMENTS

| CN | 103092407 A | 5/2013 |
| CN | 105093733 A | 11/2015 |
| JP | 2014-164752 A | 9/2014 |

*Primary Examiner* — Sanjiv D. Patel
(74) *Attorney, Agent, or Firm* — ScienBiziP, P.C.

(57) ABSTRACT

Provided is a touch-panel-integrated display device in which influences of noises due to voltages of data lines can be reduced, or noise correction can be easily performed. A touch-panel-integrated display device 1 includes a display panel that has a display area that includes a plurality of pixels defined by a plurality of gate lines 101 and a plurality of data lines 102. In the display area, a plurality of electrodes 111, and a plurality of lines 112 connected with the electrodes, are provided. A predetermined voltage is applied to each line 112 every fixed time period, and changes in the capacitance at each electrode 111 are detected. To each data line 102, a voltage having a polarity different from that for an adjacent one of the data lines 102 is applied. Each of the electrodes 111 is connected with at least one of the plurality of lines 112. The at least one of the lines 112 is arranged in the vicinity of a plurality of the data lines 102 to which voltages having different polarities are applied, or alternatively, arranged in the vicinity of one of the data lines 102 to which a voltage having the same polarity as that of a (Continued)

voltage applied to the data line 102 arranged in the vicinity of another line 112 is applied.

3 Claims, 10 Drawing Sheets

(58) Field of Classification Search
CPC .......... G09G 2320/0209; G06F 3/0412; G06F 3/0443; G06F 3/044; G06F 3/04184; G06F 3/0416; G06F 3/04182; G06F 3/041662; G06F 3/041–041662
See application file for complete search history.

(56) References Cited

U.S. PATENT DOCUMENTS

| | | | |
|---|---|---|---|
| 2012/0086665 A1* | 4/2012 | Song | G06F 3/0412 345/174 |
| 2014/0085222 A1* | 3/2014 | Park | G06F 3/0446 345/173 |
| 2014/0240279 A1 | 8/2014 | Hwang et al. | |
| 2015/0339988 A1 | 11/2015 | Kurasawa et al. | |
| 2016/0253024 A1* | 9/2016 | Aoyama | G09G 3/3648 345/174 |

\* cited by examiner

|              | Source line 102a | Source line 102b | Source line 102c | Source line 102d | Source line 102e |
|--------------|------------------|------------------|------------------|------------------|------------------|
| ...          | ...              | ...              | ...              | ...              | ...              |
| n−1 frame    | −                | +                | −                | +                | −                |
| n frame      | +                | −                | +                | −                | +                |
| n+1 frame    | −                | +                | −                | +                | −                |
| n+2 frame    | +                | −                | +                | −                | +                |
| ...          | ...              | ...              | ...              | ...              | ...              |

Fig. 3

TOUCH-PANEL-INTEGRATED DISPLAY DEVICE

TECHNICAL FIELD

The present invention relates to a touch-panel-integrated display device.

BACKGROUND ART

Conventionally, an in-cell type touch-panel-integrated display device has been known, which includes a sensor mechanism for detecting a touch position within each pixel of the display panel.

JP-A-2014-164752 discloses such a touch-panel-integrated display device. In the configuration of JP-A-2014-164752, in a display area that includes pixels defined by gate lines and data lines, a plurality of electrodes that function as touch sensors or common electrodes are arranged so as to overlap with the pixels. Further, in the display area, connection lines for applying a common voltage or a touch scan voltage to the electrodes. In the configuration of JP-A-2014-164752, the panel is driven by switching the mode between the display driving mode and the touch driving mode in a time-division manner, and a touch position is detected in the self-capacitance method. In the display driving mode, a common voltage is applied to the electrodes through the connection lines so that an image is displayed, and in the touch driving mode, a touch scan signal is applied to the electrodes through the connection lines so that a touch position is detected.

SUMMARY OF THE INVENTION

Problem to be Solved by the Invention

In the case of the in-cell type touch-panel-integrated display device as is the case with that disclosed in JP-A-2014-164752, a plurality of electrodes that function as common electrodes or sensor electrodes, and a plurality of lines for applying a common voltage or a scan voltage to the electrodes are arranged in a display area. If a plurality of lines are provided in the vicinities of a part of data lines provided in the display panel, each line is therefore affected by noises caused by voltages applied to the data lines during the detection of a touch position. In particular, in a case where voltages are applied in such a manner that alternating-current voltages having different polarities are applied to adjacent data lines, respectively, lines arranged in the vicinities of the data lines are affected by noises according to the polarities of the voltages applied to the data lines. Noises for the respective electrodes are therefore different according to the line arrangement, which makes it difficult to perform noise correction.

It is an object of the present invention to provide a touch-panel-integrated display device in which influences of noises due to voltages of data lines can be reduced, or even with influences of noises due to voltages of data lines, noise correction can be easily performed.

A touch-panel-integrated display device in one embodiment of the present invention includes: a display panel that includes a plurality of gate lines, a plurality of data lines that intersect with the gate lines, the display panel having a display area that includes pixels defined by the gate lines and the data lines; a plurality of electrodes provided in the display area; a plurality of lines connected with the electrodes in the display area; and a detection means that applies a predetermined voltage to the plurality of lines every fixed time period, and detects changes in capacitances at the electrodes. To each data line, a voltage having a polarity different from that for an adjacent one of the data lines is applied. Each of the electrodes is connected with at least one of the plurality of lines. The at least one of the plurality of lines is arranged in the vicinity of a plurality of the data lines to which voltages having polarities different from each other are applied, or alternatively, arranged in the vicinity of one of the data lines to which a voltage having the same polarity as that of a voltage applied to the data line arranged in the vicinity of another line is applied.

With an embodiment of the present invention, influences of noises due to voltages of data lines can be reduced, or even with influences of noises due to voltages of data lines, noise correction can be easily performed.

BRIEF DESCRIPTION OF DRAWINGS

FIG. 3 illustrates exemplary polarities of voltages applied to source lines illustrated in FIG. 2.

MODE FOR CARRYING OUT THE INVENTION

Figure 1:
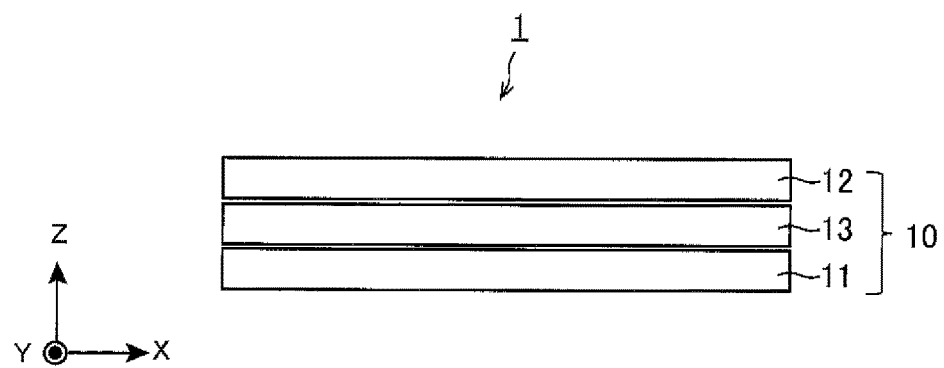
FIG. 1 is a cross-sectional view illustrating a schematic configuration of a touch-panel-equipped display device according to Embodiment 1.

A touch-panel-integrated display device in one embodiment of the present invention includes: a display panel that includes a plurality of gate lines, a plurality of data lines that Intersect with the gate lines, the display panel having a display area that includes pixels defined by the gate lines and the data lines; a plurality of electrodes provided in the display area; a plurality of lines connected with the electrodes in the display area; and a detection means that applies a predetermined voltage to the plurality of lines every fixed time period, and detects changes in capacitances at the electrodes. To each data line, a voltage having a polarity different from that for an adjacent one of the data lines is applied. Each of the electrodes is connected with at least one of the plurality of lines. The at least one of the plurality of lines is arranged in the vicinity of a plurality of the data lines to which voltages having polarities different from each other are applied, or alternatively, arranged in the vicinity of one of the data lines to which a voltage having the same polarity as that of a voltage applied to the data line arranged in the vicinity of another line is applied (the first configuration).

According to the first configuration, regarding a plurality of data lines, voltages having different polarities are applied to adjacent ones of the data lines connected to one electrode, respectively. Further, at least one of the lines is arranged in the vicinity of a plurality of the data lines to which voltages having different polarities are applied, or alternatively, arranged in the vicinity of the data line to which a voltage having the same polarity as that of a voltage applied to the data line arranged in the vicinity of another line is applied. In a case where at least one line connected to an electrode is arranged in the vicinity of a plurality of data lines to which voltages having different polarities are applied, respectively, noises caused by the voltages of the plurality of data lines are canceled, whereby noises can be reduced. Further, in a case where each line connected with each electrode is arranged in the vicinity of the data line to which a voltage having the same polarity is applied, each electrode is affected by noise having the same polarity. This makes it easier to perform noise correction, as compared with a case where noises at the respective electrodes have different polarities.

The first configuration may be further characterized in that the each of the electrodes is connected with 2n of the lines (n is an Integer equal to or more than 1), and the 2n of the lines are arranged in the vicinity of 2n of the data lines, wherein the number of the data line to which a voltage having a positive polarity is applied and the number of the data line to which a voltage having a negative polarity is applied are equal to each other (the second configuration).

According to the second configuration, each electrode is connected with 2n lines. These lines are arranged in the vicinity of the data line to which a voltage having a positive polarity is applied and the data line to which a voltage having a negative polarity is applied, respectively. This allows noises caused by the voltages of the respective data lines to be canceled by each other, thereby reducing noises at each electrode.

The first configuration may be further characterized in that the each of the electrodes is connected with one of the plurality of lines; and the one of the plurality of lines is arranged to be bent so as to alternately overlap with 2n of the data lines that include the data line to which a voltage having a positive polarity is applied and the data line to which a voltage having a negative polarity is applied, wherein the number of the data line to which a voltage having a positive polarity is applied and the number of the data line to which a voltage having a negative polarity is applied are equal to each other (the third configuration).

According to the third configuration, each electrode is connected with one line. This line is bent so as to alternately overlap with 2n of the data lines that include the data lines to which a voltage having a positive polarity is applied and the data lines to which a voltage having a negative polarity is applied, wherein the number of the former and the number of the latter are equal to each other. This allows noises caused by the voltages of the respective data lines to be canceled by each other, thereby reducing noises at each electrode.

Any one of the first to third configurations may be further characterized in that the display panel includes: an active matrix substrate on which the plurality of gate lines and the plurality of data lines are arranged; a counter substrate that is provided so as to be opposed to the active matrix substrate and has color filters; and a liquid crystal layer that is provided between the active matrix substrate and the counter substrate, and the plurality of electrodes and the plurality of lines are arranged on the active matrix substrate (the fourth configuration).

With the fourth configuration, a plurality of electrodes can be caused to function as common electrodes, whereby the liquid crystal layer can be driven in the in-plane switching (IPS) mode and the fringe field switching (FFS) mode.

Any one of the first to third configurations may be further characterized in that the display panel includes: an active matrix substrate on which the plurality of gate lines and the plurality of data lines are arranged; a counter substrate that is provided so as to be opposed to the active matrix substrate and has color filters; and a liquid crystal layer that is provided between the active matrix substrate and the counter substrate, and the plurality of electrodes and the plurality of lines are arranged on the counter substrate (the fifth configuration).

With the fifth configuration, a plurality of electrodes can be caused to function as common electrodes, whereby the liquid crystal layer can be driven in the vertical alignment (VA) mode.

The following description describes embodiments of the present invention in detail, while referring to the drawings. Identical or equivalent parts in the drawings are denoted by the same reference numerals, and the descriptions of the same are not repeated. To make the description easy to understand, in the drawings referred to hereinafter, the configurations are simply illustrated or schematically illustrated, or the illustration of a part of constituent members is omitted. Further, the dimension ratios of the constituent members illustrated in the drawings do not necessarily indicate the real dimension ratios.

Embodiment 1

FIG. 1 is a cross-sectional view illustrating a schematic configuration of a touch-panel-equipped display device according to Embodiment 1 of the present invention.

As illustrated in FIG. 1, the touch-panel-integrated display device 1 includes, a display panel 10, an active matrix substrate 11, a counter substrate 12, and a liquid crystal layer 13 interposed between the active matrix substrate 11 and the counter substrate 12.

Figure 2:
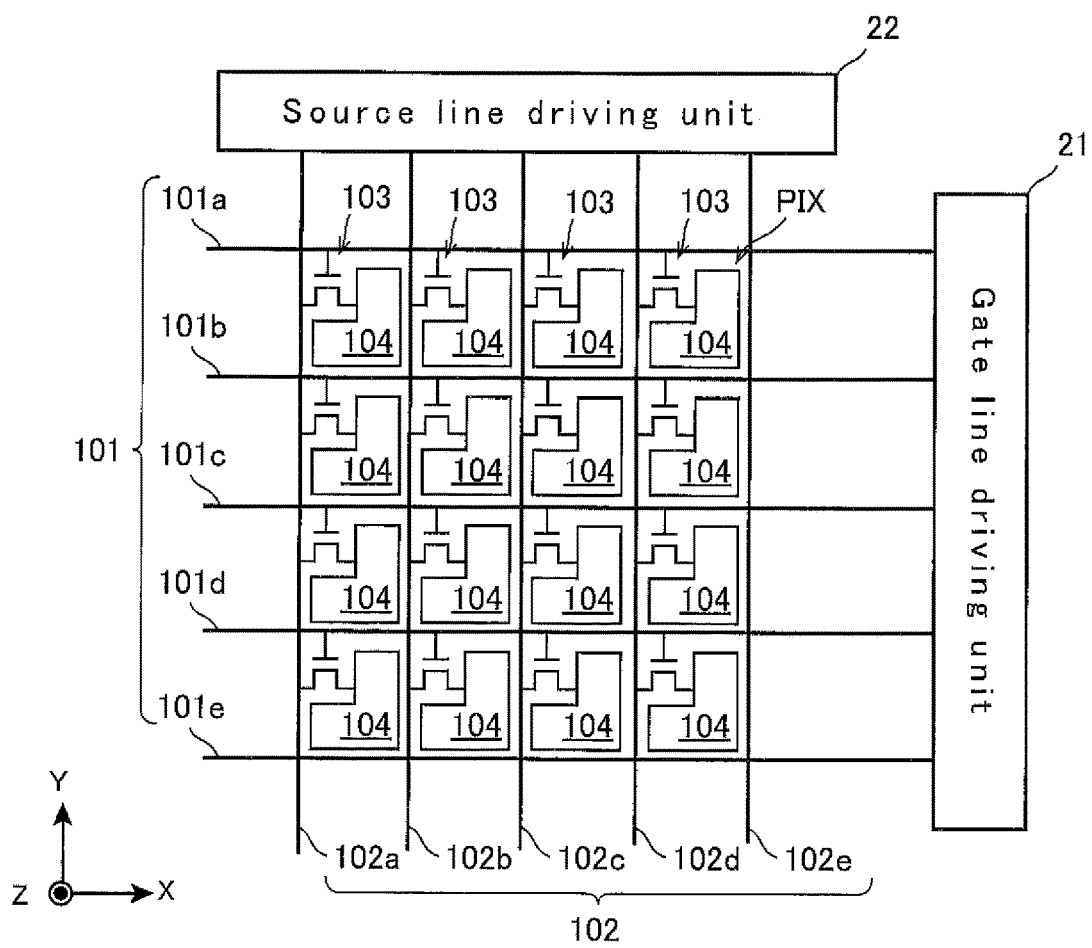
FIG. 2 is a plan view illustrating a schematic configuration of an active matrix substrate illustrated in FIG. 1.

FIG. 2 is a plan view illustrating a schematic configuration of the active matrix substrate 11 illustrated in FIG. 1. As illustrated in FIG. 2, a plurality of gate lines 101, and a plurality of source lines 102 that intersect with the gate lines 101, are provided on the active matrix substrate 11. In pixels PIX defined by the gate lines 101 and the source lines 102, switching elements 103 connected with the gate lines 101 and the source lines 102, and pixel electrodes 104 connected with the switching elements 103, are provided.

The gate lines 101 are connected with a gate line driving unit 21 provided outside the display area of the active matrix substrate 11. The gate line driving unit 21 applies a voltage that switches the state of the gate line 101 into a selected state, to the gate lines 101 one by one in the horizontal scanning periods, respectively, so that each gate line 101 is scanned.

Further, the source lines 102 are connected with a source line driving unit 22 provided outside the display area of the active matrix substrate 11. The source line driving unit 22 applies, to each of the source lines 102, an alternating-current voltage having a polarity that is reversed every predetermined period, in such a manner that two adjacent ones of the source lines 102 have opposite polarities, respectively. For example, in the example illustrated in FIG. 2, as illustrated in FIG. 3, the column reverse driving is performed, in which the polarity of the voltage applied to the source lines 102a, 102c, 102e, and the polarity of the voltage applied to the source lines 102b, 102d, are opposite to each other, and the polarity of the voltage applied to each source line is reversed every frame.

Figure 4:
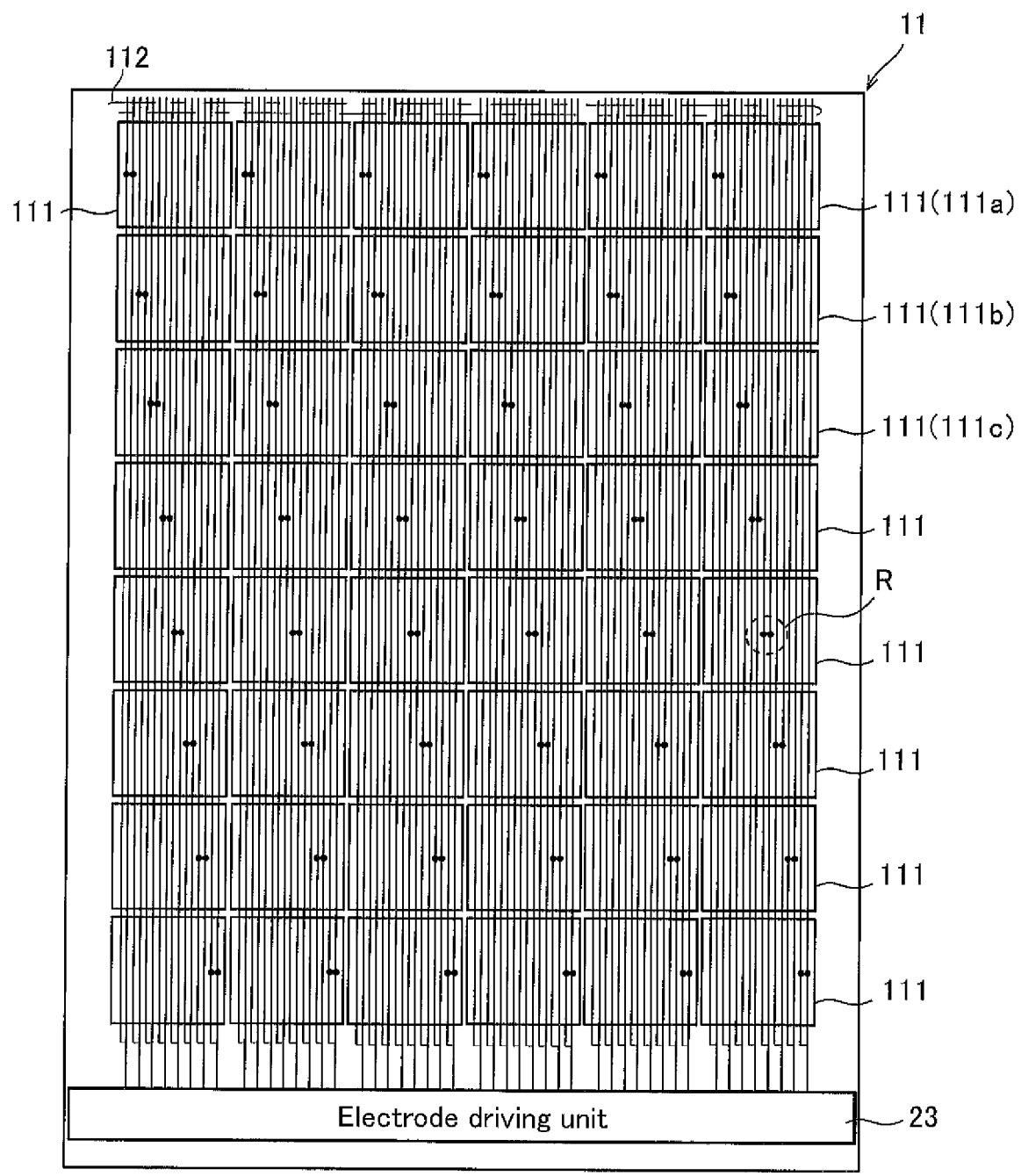
FIG. 4 is a schematic plan view illustrating electrodes and lines provided on the active matrix substrate illustrated in FIG. 1.

In the display area of the active matrix substrate 11, further, as illustrated in FIG. 4, common electrodes or a plurality of electrodes 111 that function as sensor electrodes for detecting a position of touch by a conductive body such as a user's finger, a plurality of lines 112 connected to the electrodes 111, and an electrode driving unit 23 connected with the lines 112. In FIG. 4, the illustration of the gate lines 101, the source lines 102, the switching elements 103, and the pixel electrodes 104 is omitted. The positional relations among the respective parts of the active matrix substrate 11 are described below.

Each of the electrodes 111, for example, has an approximately 4 mm×4 mm square shape, and the electrodes 111 are arranged so as to overlap with the pixel electrodes 104 (see FIG. 2). In the present embodiment, each electrode 111 is connected with two lines 112 in such a manner that the electrodes 111 are connected to different pairs of the lines 112, respectively, as illustrated in the broken-line frame R in FIG. 4.

The electrode driving unit 23 switches the mode in a time-division manner, between the display mode in which the electrodes 111 are caused to function as common electrodes, and the touch detection mode in which the electrodes 111 are caused to function as the sensor electrodes. In the display mode, the electrode driving unit 23 applies a certain set common voltage (hereinafter referred to as a first voltage) to the electrodes 111 through the lines 112. This causes the liquid crystal layer 13 to be driven in the FFS mode by the electric fields generated between the electrodes 111 and the pixel electrodes 104. In the touch detection mode, the electrode driving unit 23 applies, to the electrodes 111 through the lines 112, a sensor voltage (second voltage) that is different from the first voltage, so that respective changes in capacitances are detected at the electrodes 111.

Figure 5:
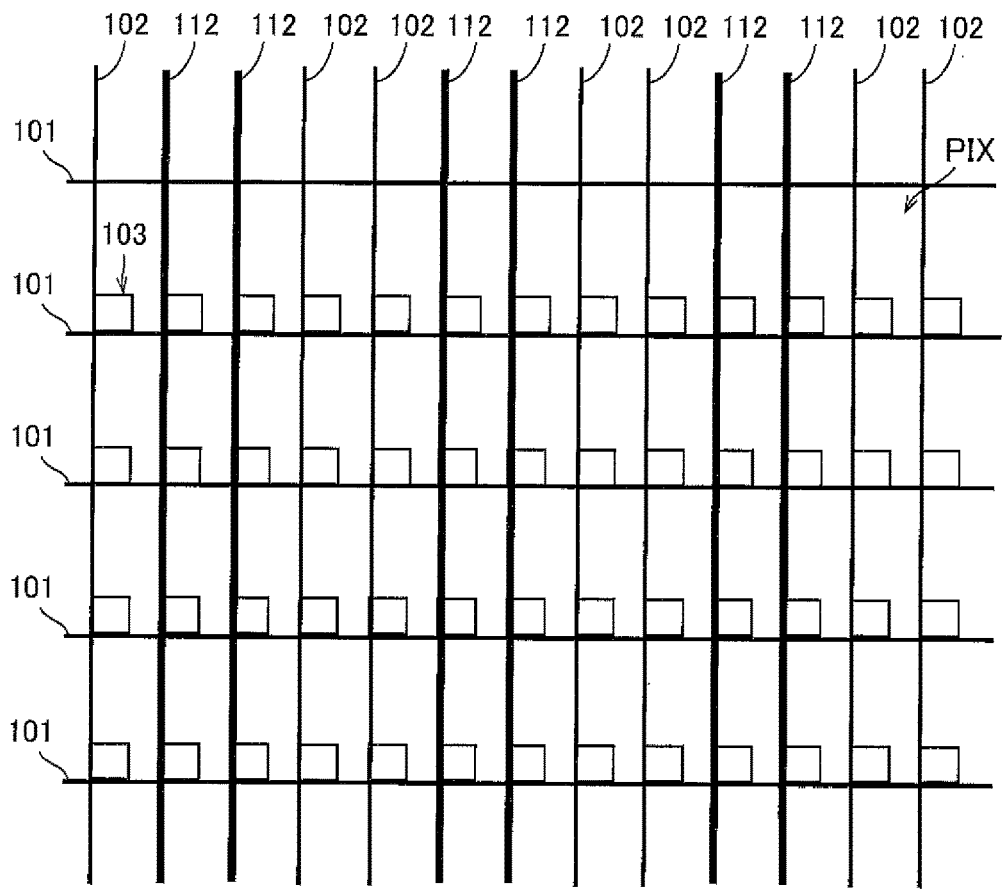
FIG. 5 is a schematic plan view illustrating an exemplary arrangement of lines illustrated in FIG. 4.
Figure 6:
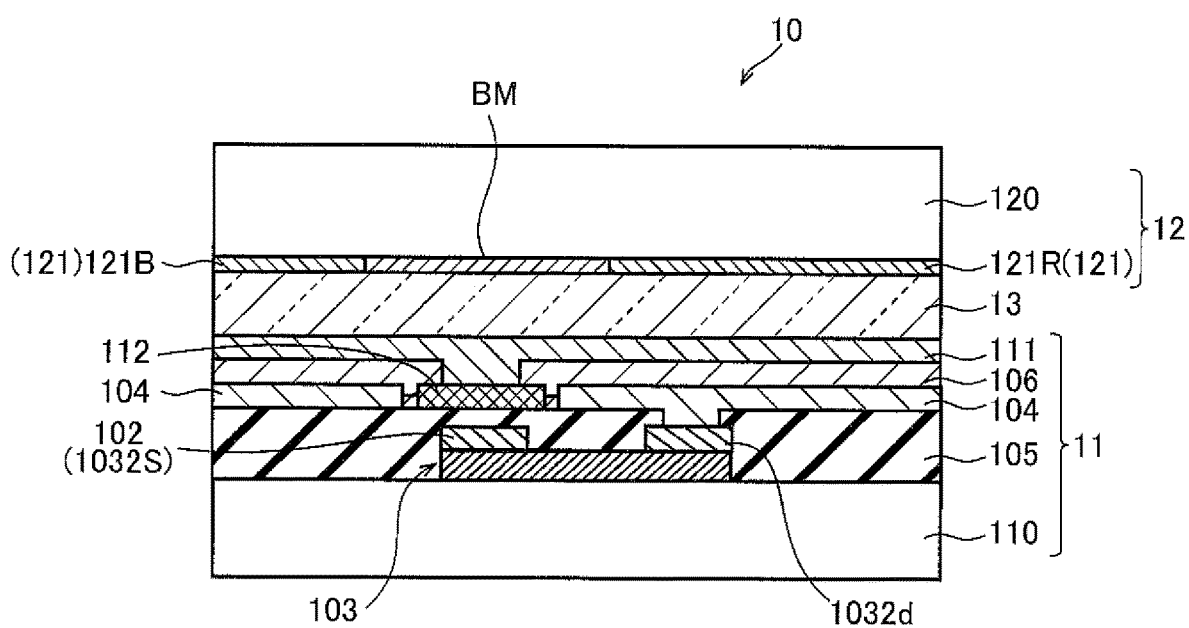
FIG. 6 is a schematic cross-sectional view illustrating a part of the display panel in the vicinities of an area where the line illustrated in FIG. 5 is arranged.

Next, the following description describes an exemplary arrangement of the lines 112. FIG. 5 is a plan view illustrating apart of the active matrix substrate 11 in which apart of the lines 112 are arranged. Further, FIG. 6 is a schematic cross-sectional view illustrating a part of the display panel 10 in the vicinities of an area where one of the lines 112 is arranged. In FIG. 5, for convenience sake, the illustration of the electrodes 111 is omitted. Further, though not Illustrated in FIG. 5, the source lines 102 are provided at positions where the lines 112 are provided, so as to overlap with the lines 112.

As illustrated in FIG. 5, each line 112 is arranged so as to be approximately parallel with the source lines 102. The following description describes a cross section of the display panel 10 at a position where the line 112 is provided. As illustrated in FIG. 6, the active matrix substrate 11 has the following configuration: on a substrate 110 having translucency, a switching element 103 including a semiconductor layer 1031 and a source and drain 1032 (1032s, 1032d) Is formed, and the drain 1032d of the switching element 103 and the pixel electrode 104 are connected with each other, with an insulating layer 105 being interposed therebetween. The source 1032s of the switching element 103 is integrally formed with the source line 102 of the pixel in which the switching element 103 concerned Is provided. On the Insulating layer 105, the pixel electrode 104 and the line 112 are arranged, and on the pixel electrode 104 and the line 112, the electrode 111 is arranged with the insulating layer 106 being interposed therebetween. On the electrode 111, the liquid crystal layer 13 is provided, and on the liquid crystal layer 13, the counter substrate 12 is provided.

The counter substrate 12 has the following configuration: on a substrate 120 having translucency, color filters 121 each of which corresponds to any one color of red (R), green (G), and blue (B), as well as a black matrix BM, are provided. The color filters 121 are provided at positions that correspond to the pixels formed on the active matrix substrate 11, respectively. Here, apart where the color filter 121B of blue (B) and the color filter 121R of red (R) are provided is illustrated as an example.

As illustrated in FIG. 6, each line 112 is arranged so as to overlap with the source line 102, and is covered with the black matrix BM.

Next, the following description describes the source lines 102 provided at positions where the lines 112 are arranged. As illustrated in FIG. 4, in the present embodiment, each electrode 111 is connected with two adjacent ones of the lines 112. Two of the lines 112 connected with one of the electrodes 111 are arranged so as to overlap with two of the source lines 102 to which alternating-current voltages having polarities opposite to each other are applied, respectively.

Figure 7:
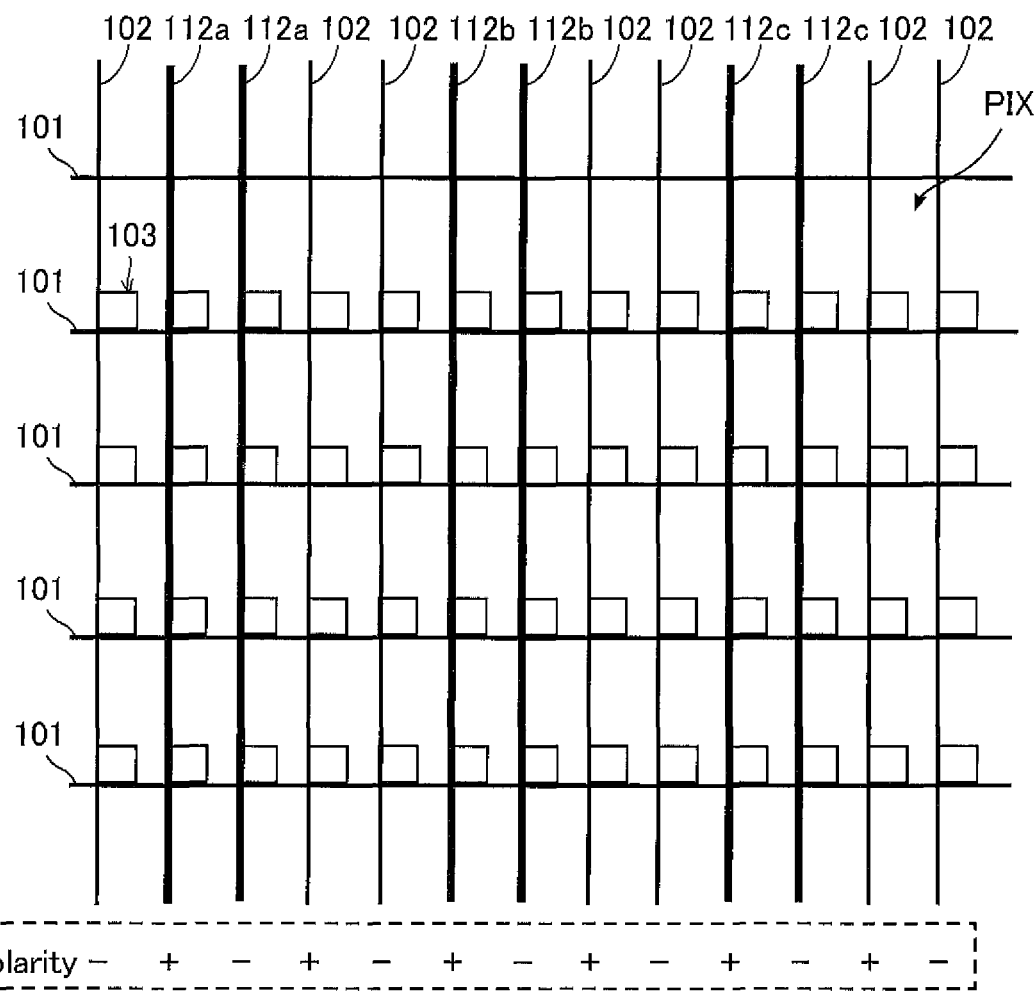
FIG. 7 explains polarities of source lines arranged so as to overlap with the lines illustrated in FIG. 5.

For example, as illustrated in (a) of FIG. 7, in a case where the lines 112 connected with the electrodes 111a to 111c illustrated in FIG. 4, two lines 112 being connected to each electrode, are referred to as lines 112a, 112b, and 112c, respectively, the two lines 112a are arranged so as to overlap with the two source lines 102 to which a voltage having a positive polarity and a voltage having a negative polarity are applied, respectively, as illustrated in (b) of FIG. 7, and so do the two lines 112b, and the two lines 112c.

In this example, each electrode 111 is connected with two of the lines 112 that are arranged in the vicinity of two adjacent ones of the source lines 102, but the number of the lines 112 connected with one electrode 111 is not limited to this. One electrode 111 may be connected with 2n lines 112 (n: an integer equal to or more than 1) arranged in the vicinity of n source lines 102 to which a voltage having a positive polarity is applied and n source lines 102 to which a voltage having a negative polarity is applied.

The line 112 is affected by noise corresponding to the polarity of the voltage applied to the source line 102 arranged in the vicinity of the line 112. In other words, by the source line 102, noise of a positive polarity Is caused to affect the capacitance of the electrode 111 connected to the line 112 arranged in the vicinity of the source line 102 to which a voltage having a positive polarity is applied. On the other hand, by the source line 102, noise of a negative polarity is caused to affect the capacitance of the electrode 111 connected to the line 112 arranged in the vicinity of the source line 102 to which a voltage having a negative polarity is applied. In the case where the polarities of the voltages of the source lines 102 arranged in the vicinity of the lines 112 are not uniform, therefore, the noise polarity at each electrode 111 varies as well, which makes noise differences among the electrodes 111 greater.

In the present embodiment, two lines 112 connected to each electrode 111 are arranged in the vicinities of the source lines 102 to which voltages having different polarities are applied, respectively. Noises caused by the voltages applied to the two source lines 102 are canceled by each other, whereby noise at each electrode 111 can be reduced.

Embodiment 2

The following description describes, as the present embodiment, the connection of the lines 112 that is different from the configuration of Embodiment 1 described above.

Figure 8:
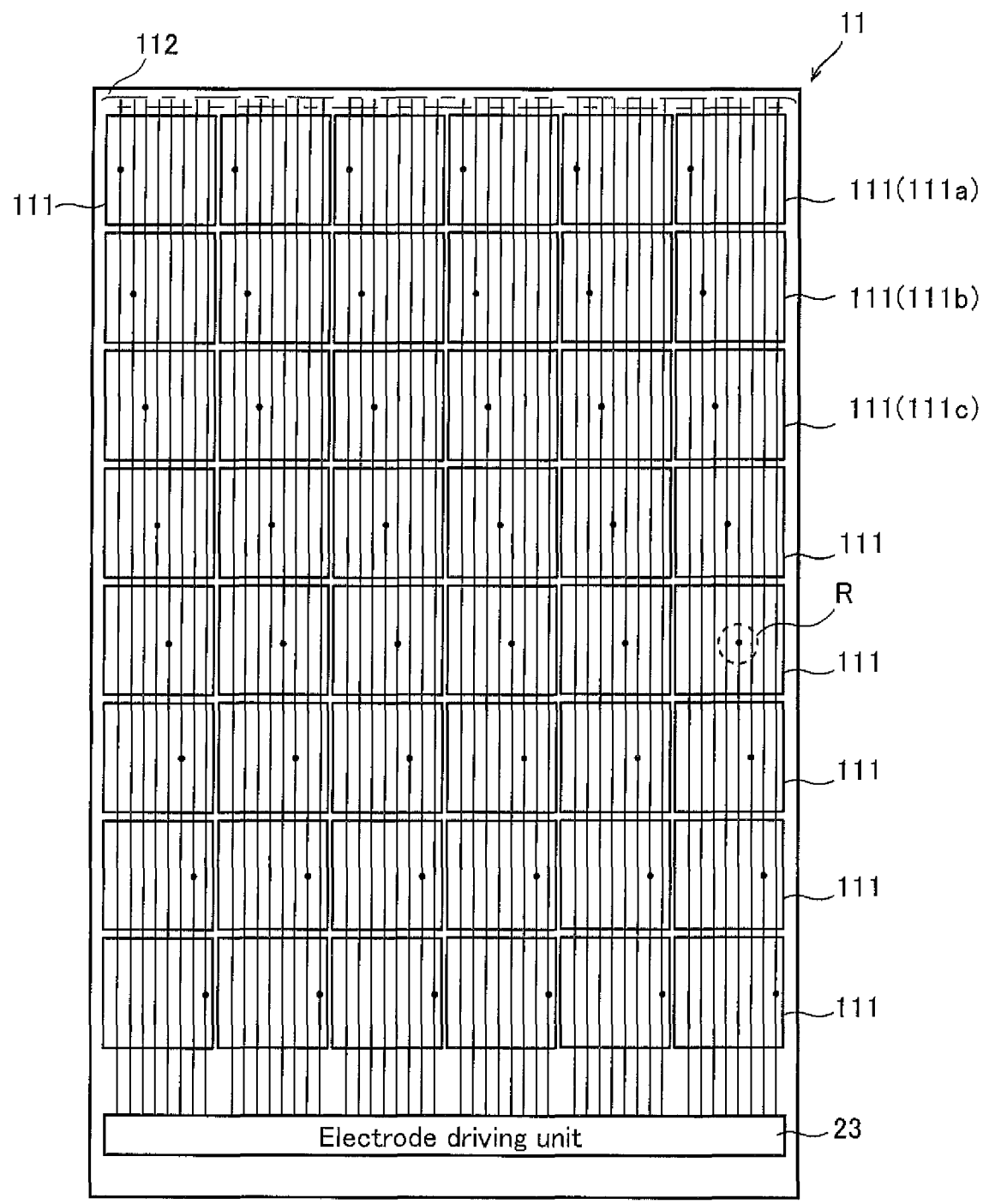
FIG. 8 is a schematic plan view illustrating electrodes and lines provided on an active matrix substrate in Embodiment 2.

FIG. 8 is a schematic diagram illustrating an exemplary connection of the electrodes 111 and the lines 112 in the active matrix substrate 11 in the present embodiment. In FIG. 8, the configurations identical to those in Embodiment 1 are denoted by the same reference symbols as those in Embodiment 1.

As illustrated in FIG. 8, in the present embodiment, the plurality of electrodes 111 provided on the active matrix substrate 11 are different from those in Embodiment 1 regarding the point that the electrodes 111 are connected with the different lines 112, respectively, in such a manner that each electrode 111 is connected with one of the lines 112.

Figure 9:
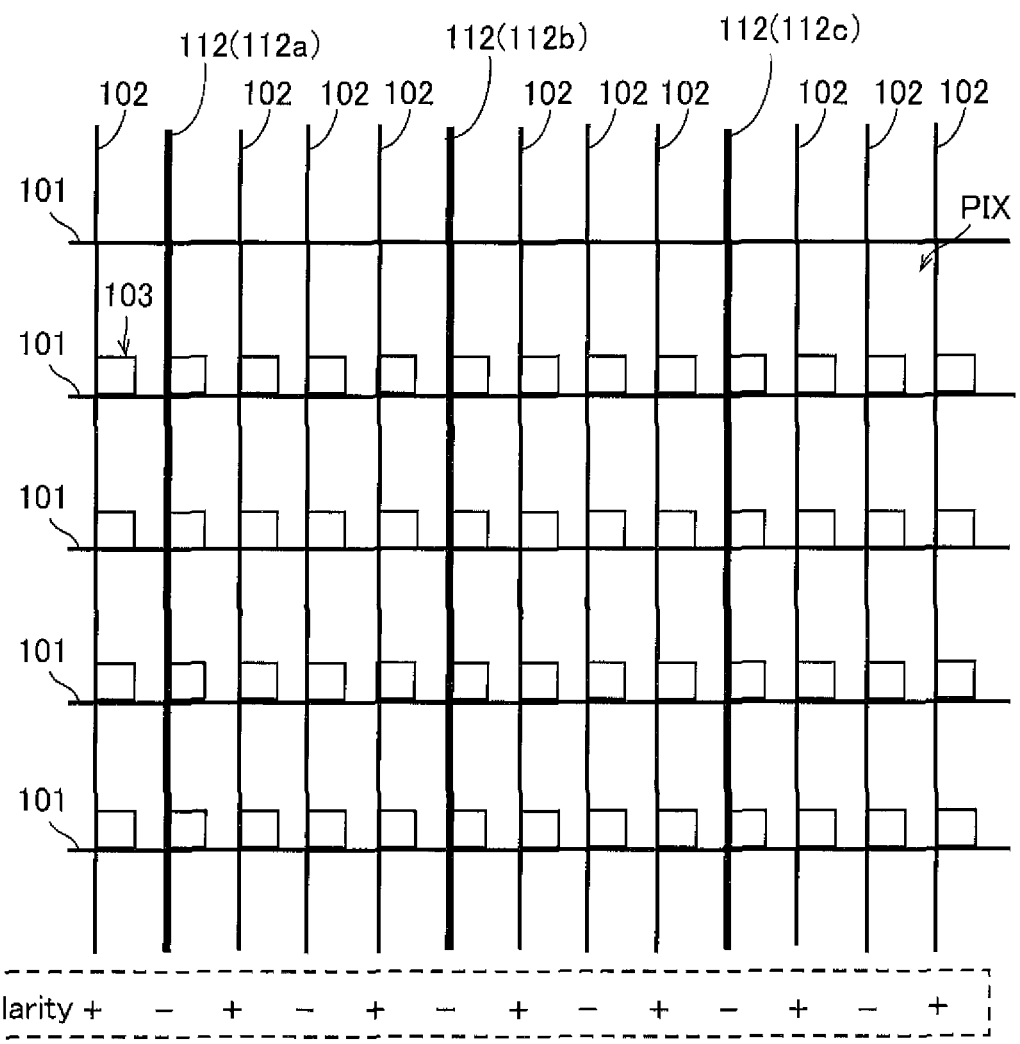
FIG. 9 is a schematic plan view illustrating exemplary arrangement of the lines illustrated in FIG. 8, and polarities of the source lines.

(a) of FIG. 9 is a schematic plan view illustrating exemplary arrangement of the lines 112 in the present embodiment. (b) of FIG. 9 illustrates the polarity of the voltage applied to each source line 102 illustrated in (a) of FIG. 9, in a certain frame. In (a) of FIG. 9, the illustration of the electrodes 111 is omitted. Further, though not illustrated in (a) of FIG. 9, the source lines 102 are arranged at positions that overlap with the lines 112.

In the present embodiment, as illustrated in (a) and (b) of FIG. 9, each line 112 is arranged so as to overlap with the source line 102 to which a voltage of the same polarity is applied. For example, in a case where the lines 112 connected with the electrodes 111a to 111c in FIG. 8, respectively, are assumed to be lines 112a, 112b, 112c, respectively, the lines 112a, 112b, 112c are all arranged so as to overlap with the source lines 102 to which voltages having a negative polarity (−) are applied, in this example, as illustrated in (b) of FIG. 9.

It should be noted that the lines 112 may be arranged so as to overlap with the source lines 102 to which voltages having a negative polarity (−) are applied, or alternatively, may be arranged so as to overlap with the source line 102 to which voltages having a positive polarity (+) are applied. In short, the configuration may be arbitrary as long as the lines 112 are arranged so that each overlaps the source line 102 to which a voltage having the same polarity is applied. Further, though each electrode 111 is connected to one of the lines 112 in this example, one electrode 111 may be connected with a plurality of the lines 112.

In this way, each line 112 is arranged in the vicinity of the source line 102 to which a voltage having the same polarity is applied, whereby each electrode 111 is affected by noise having the same polarity in the touch detection mode. This makes it easier to perform noise correction with respect to changes in the capacitance detected at each electrode 111 in the touch detection mode, as compared with a case where the source lines 102 arranged in the vicinity of each line 112 have different polarities.

Embodiment 3

The present embodiment is the same as Embodiment 2 regarding the point that the electrodes 111 are connected with the different lines 112, respectively, in such a manner that each electrode 111 is connected with one of the lines 112, but the shape of the line 112 is different.

Figure 10A:
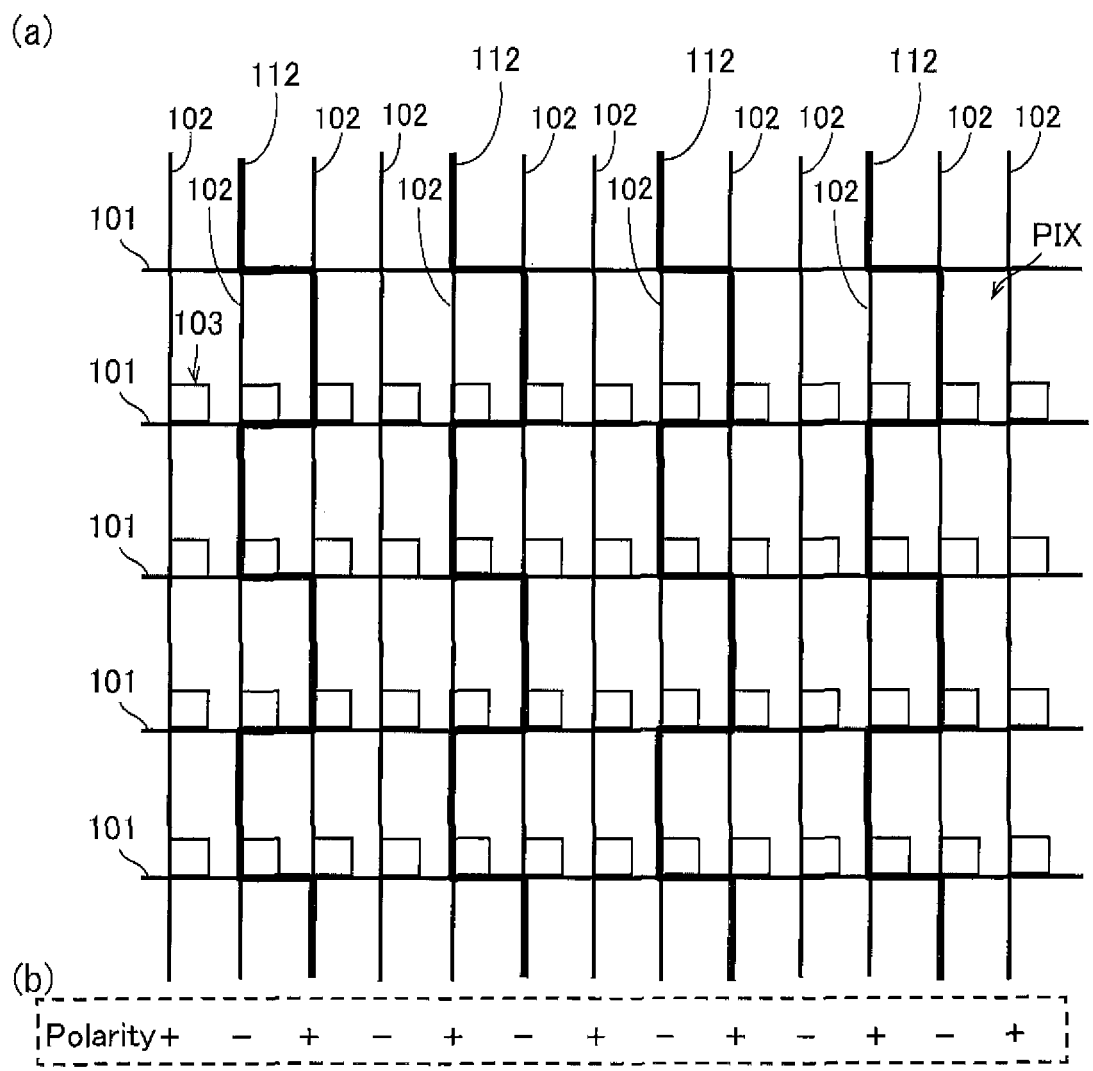
FIG. 10A is a schematic plan view illustrating an exemplary arrangement of the lines in Embodiment 2, and polarities of the source lines.

(a) of FIG. 10A is a schematic plan view Illustrating an exemplary arrangement of the lines 112 in the present embodiment, and (b) of FIG. 10A illustrates the polarity of the voltage applied to each source line 102 illustrated in (a) of FIG. 10A, in a certain frame. In (a) of FIG. 10A, the illustration of the electrodes 111 is omitted. Further, though not illustrated in (a) of FIG. 10A, the source lines 102 are arranged at positions that overlap with the lines 112.

In the present embodiment, as illustrated in (a) of FIG. 10A, one of the lines 112 is bent so as to alternately overlap with two adjacent ones of the source lines 102. In other words, in the present embodiment, one of the lines 112 is arranged in the vicinity of two of the source lines 102 to which a voltage having a positive polarity and a voltage having a negative polarity are applied, respectively. In the touch position detection mode, therefore, noises caused by voltages of the two of the source lines 102 arranged in the vicinity of one of the lines 112 are canceled by each other, whereby noises at each electrode 111 can be reduced.

Figure 10B:
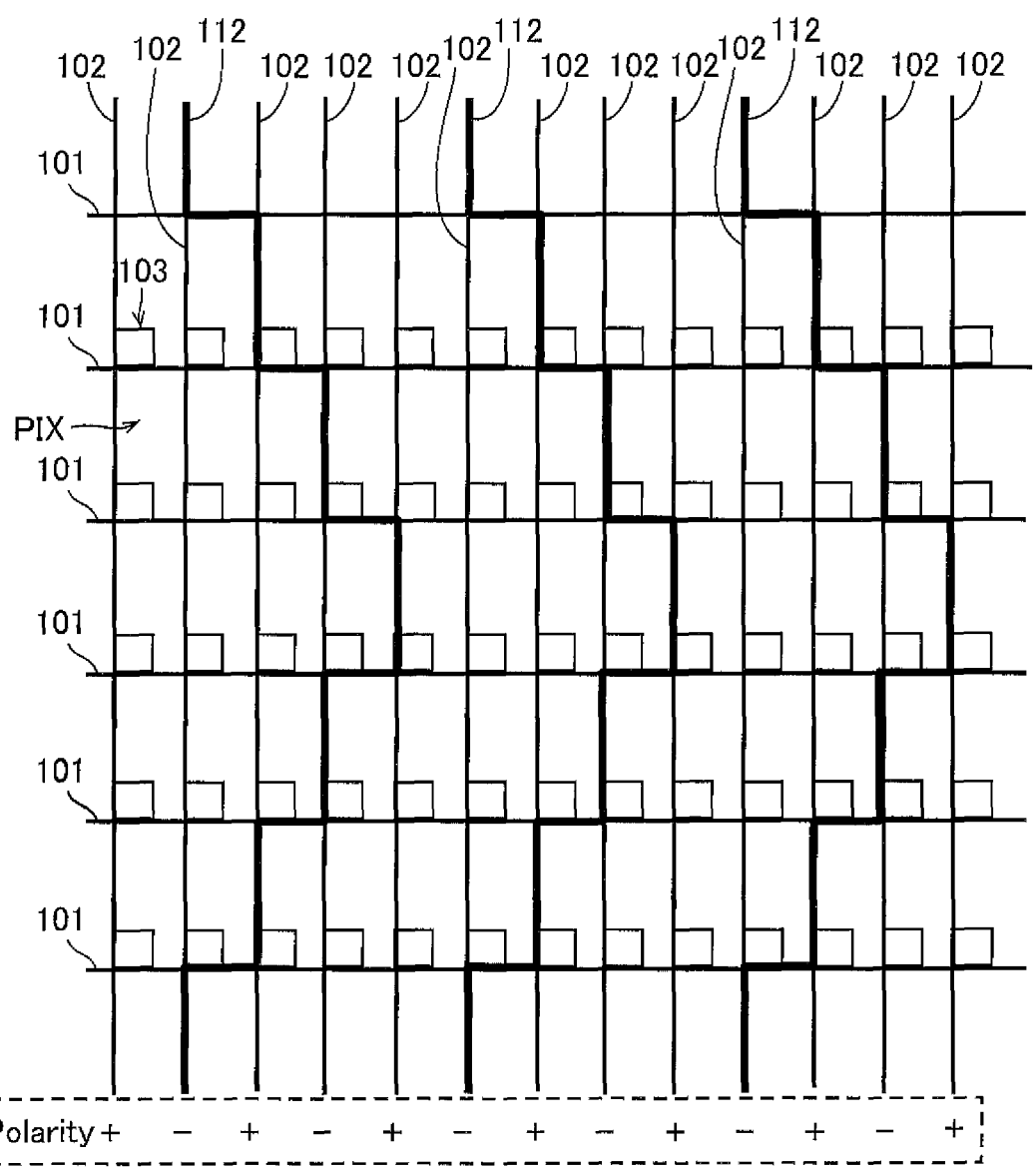
FIG. 10B is a schematic plan view illustrating an exemplary arrangement of the lines that is different from the arrangement illustrated in FIG. 10A.

In the present embodiment, each electrode 111 may be connected with one of the lines 112, or alternatively, may be connected with a plurality of the lines 112. Further, this example is such an example that each line 112 is bent so as to alternately overlap with two adjacent ones of the source lines 102, but the configuration may be such that, for example, as illustrated in FIG. 10B, each line 112 is bent so as to alternately overlap with four adjacent ones of the source lines 102. In other words, one line 112 may be bent so as to alternately overlap with 2n source lines 102 (n: an integer equal to or more than 1) including n source lines 102 to which a voltage having a positive polarity is applied and n source lines 102 to which a voltage having a negative polarity is applied.

Modification Example

The embodiments disclosed herein should be considered to be illustrating in all respects, and not limiting. The scope of the present invention is indicated, not by the above descriptions of the embodiments, but the scope of claims, and is intended to encompass meanings equivalent to the scope of claims, and all modifications within the scope. The following description describes the modification examples.

Figure 11:
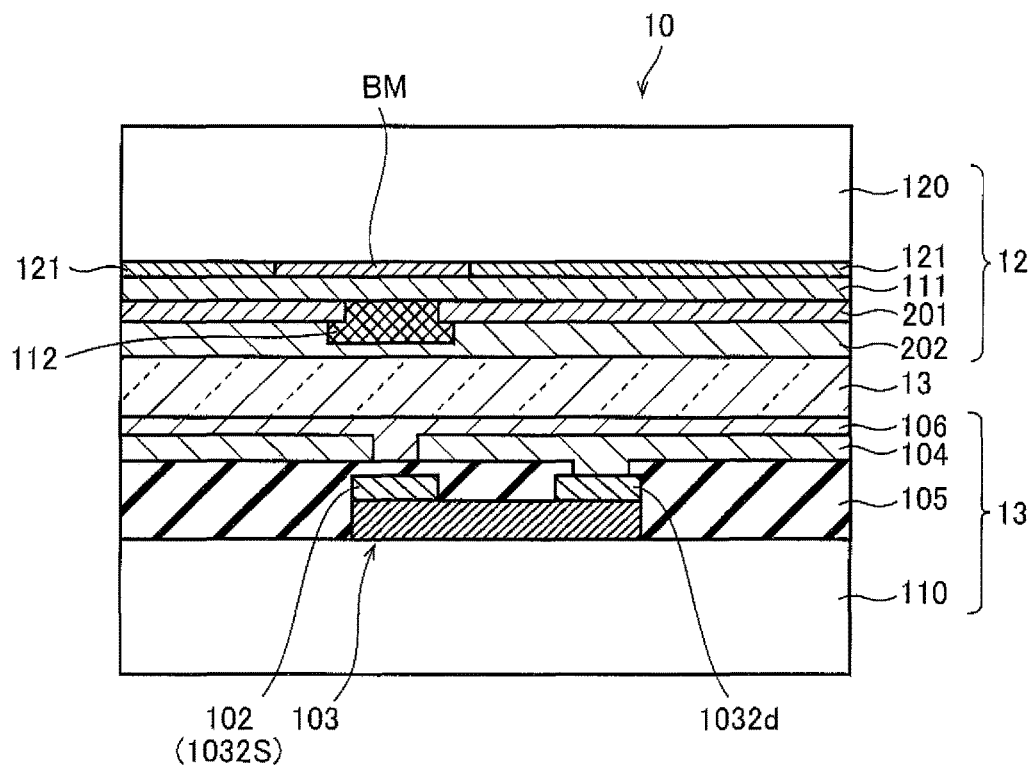
FIG. 11 is a schematic cross-sectional view illustrating a part of the display panel in the vicinities of an area where the lines are arranged, in Modification Example (1).

(1) The above description of the embodiment describes an example in which the liquid crystal layer 13 is driven in the FFS mode, and the electrodes 111 and the lines 112 are provided on the active matrix substrate 11. The configuration, however, may be as follows. FIG. 11 schematically illustrates across section of apart of the display panel 10 in the vicinities of an area where the lines are arranged, in the present modification example. In FIG. 11, the configurations identical to those in the embodiments are denoted by the same reference symbols as those in the embodiments.

As illustrated in FIG. 11, in the present modification example, the electrodes 111 are in contact with the color filters 121 and the black matrix BM on the counter substrate 12, and are arranged so as to cover the pixels, respectively, on the active matrix substrate 11. Between the electrodes 111 and the liquid crystal layer 13, insulating layers 201, 202 are provided. The lines 112 pass through the insulating layer 201 to be connected with the electrodes 111, and are arranged so as to overlap with the black matrix BM and the source lines 102. In the present modification example, therefore, in the liquid crystal layer 13, liquid crystal molecules having negative dielectric anisotropy are aligned vertically with respect to the substrate 110, by electric fields generated between the electrodes 111 on the counter substrate 12 and the pixel electrodes 104 on the active matrix substrate 11. In other words, in the present modification example, the liquid crystal layer 13 is driven in the vertical alignment (VA) mode.

Figure 12:
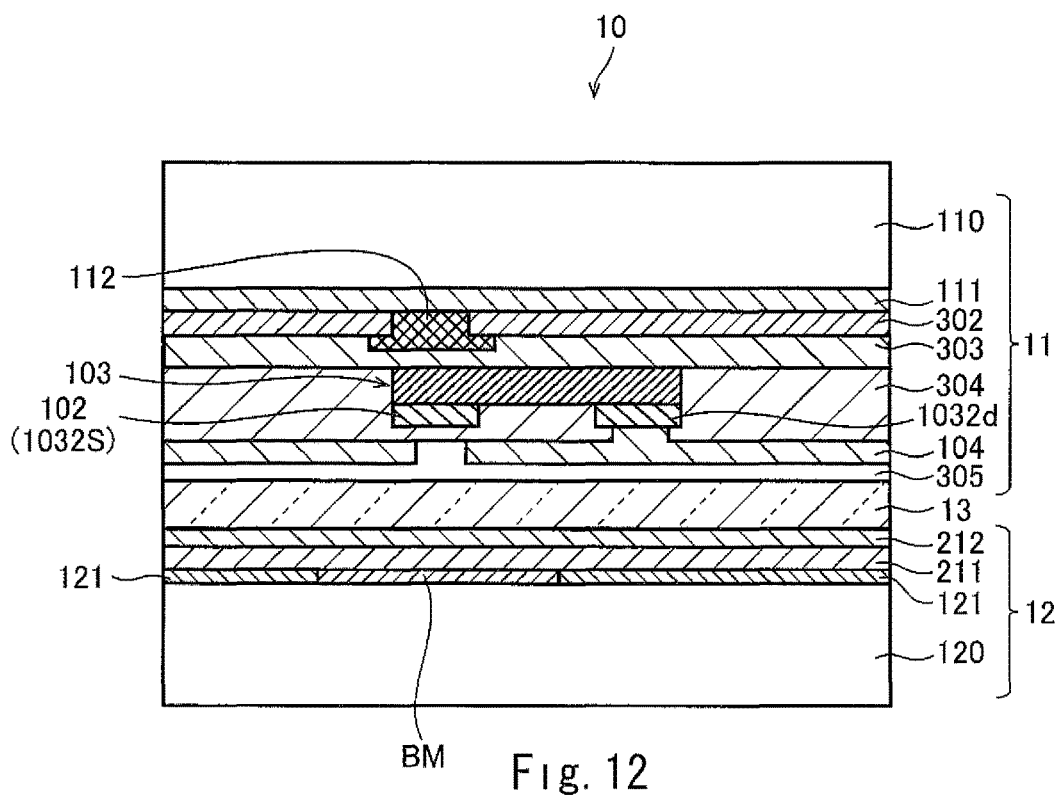
FIG. 12 is a schematic cross-sectional view illustrating a part of the display panel in the vicinities of an area where the lines are arranged, in Modification Example (2).

(2) The present modification example described herein is an example having a configuration different from the above-described modification example (1) in a case where the liquid crystal layer 13 is driven in the VA mode. FIG. 12 schematically Illustrates a cross section of a part of the display panel 10 in the present modification example, in the vicinity of an area where the lines are arranged. In FIG. 12, the configurations identical to those in the above-described embodiments are denoted by the same reference symbols as those in the embodiments.

As illustrated in FIG. 12, the active matrix substrate 11 is arranged on the upper side with respect to the counter substrate 12 (the viewing side). The active matrix substrate 11 has the following configuration. The electrodes 111 are provided on the substrate 110, and insulating layers 302, 303 as well as the lines 112 are provided between the electrodes 111 and the switching elements 103. The lines 112 pass through the Insulating layer 302 to be connected with the electrodes 111, and are arranged so as to overlap with the source lines 102. The switching elements 103 are provided on the insulating layer 303, and an insulating layer 304 is provided between the insulating layer 303 and the pixel electrodes 104. Further, an insulating layer 305 is provided between the liquid crystal layer 13 and the pixel electrodes 104. Still further, common electrodes 211 are provided so as to be in contact with the color filters 121 and the black matrix BM on the counter substrate 12, and an insulating layer 212 is provided between the common electrodes 211 and the liquid crystal layer 13.

In this example, liquid crystal molecules having negative dielectric anisotropy are aligned vertically with respect to the substrate 110, by electric fields generated between the pixel electrodes 104 and the common electrodes 211, whereby the liquid crystal layer 13 is driven. In other words, in this case, the electrodes 111 function exclusively as sensor electrodes, and only sensor voltages are applied to the lines 112 every fixed period by the electrode driving unit 23 (see FIG. 4 and the like).

(3) The above descriptions of the embodiments describe examples in which the column reverse driving is performed in which an alternating-current voltage having a polarity that is reversed every frame is applied to each source line 102. The configuration, however, may be such that the dot inversion driving is performed in which an alternating-current voltage having a polarity that is reversed every horizontal period is applied to each source line 102.

(4) The above descriptions of the embodiments describe examples in which the lines 112 are arranged so as to overlap with the source lines 102, but the configuration may be, for example, such that the lines 112 are arranged at positions that overlap with the black matrix BM and are deviated from the source lines 102 to left or right. In short, each line 112 is arranged in the vicinity of one of the source lines 102.

The invention claimed is:

1. A touch-panel-integrated display device comprising:
   a display panel that includes a plurality of gate lines, a plurality of data lines that intersect with the plurality of gate lines, the display panel having a display area that includes pixels defined by the plurality of gate lines and the plurality of data lines;
   a plurality of electrodes provided in the display area to which a plurality of first lines connected; and
   a detection circuit that applies a predetermined voltage to the plurality of first lines at a fixed time period, and detects changes in capacitances at the plurality of electrodes,
   wherein:
   a voltage having a polarity different from a voltage applied to an adjacent one of the plurality of data lines is applied to each of the plurality of data lines;
   each of the plurality of electrodes is connected with at least one of the plurality of first lines;
   the at least one of the plurality of first lines is arranged in the vicinity of the plurality of data lines, or arranged in a vicinity of one of the plurality of data lines to which a voltage having a same polarity as a voltage applied to one of the plurality of data lines arranged in a vicinity of a second line is applied;
   and
   the one of the plurality of first lines is bent to overlap at least two of the plurality of data lines that include one of the plurality of data lines to which a voltage having a positive polarity is applied and one of the plurality of data lines to which a voltage having a negative polarity is applied; and
   the positive polarity is applied to a same number of the at least two of the plurality of data lines as the negative polarity.

2. The touch-panel-integrated display device according to claim 1, wherein:
   the display panel further includes:
   an active matrix substrate on which the plurality of gate lines and the plurality of data lines are arranged;
   a counter substrate provided such that it is opposed to the active matrix substrate and has color filters; and
   a liquid crystal layer is provided between the active matrix substrate and the counter substrate; and
   the plurality of electrodes and the plurality of first lines are arranged on the active matrix substrate.

3. The touch-panel-integrated display device according to claim 1, wherein:
   the display panel further includes:
   an active matrix substrate on which the plurality of gate lines and the plurality of data lines are arranged;
   a counter substrate provided such that it is opposed to the active matrix substrate and has color filters; and
   a liquid crystal layer is provided between the active matrix substrate and the counter substrate; and
   the plurality of electrodes and the plurality of first lines are arranged on the counter substrate.

* * * * *